2,998,267
COUPLING SYSTEMS FOR ARTICULATED VEHICLES

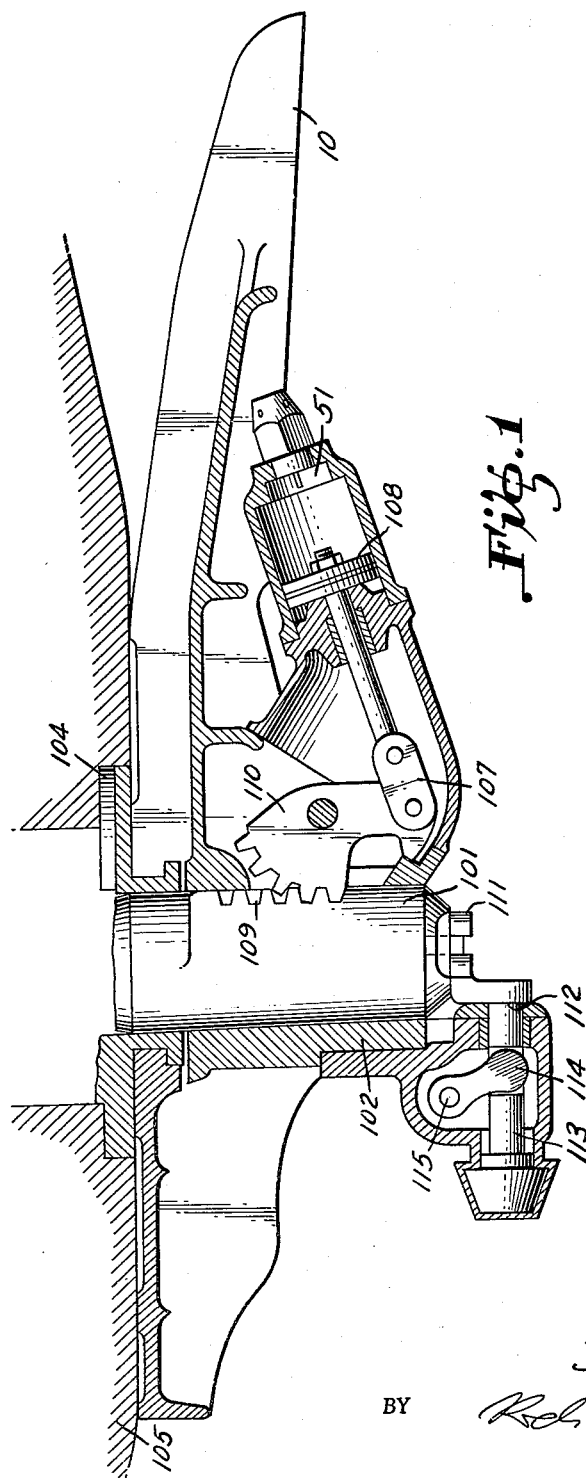

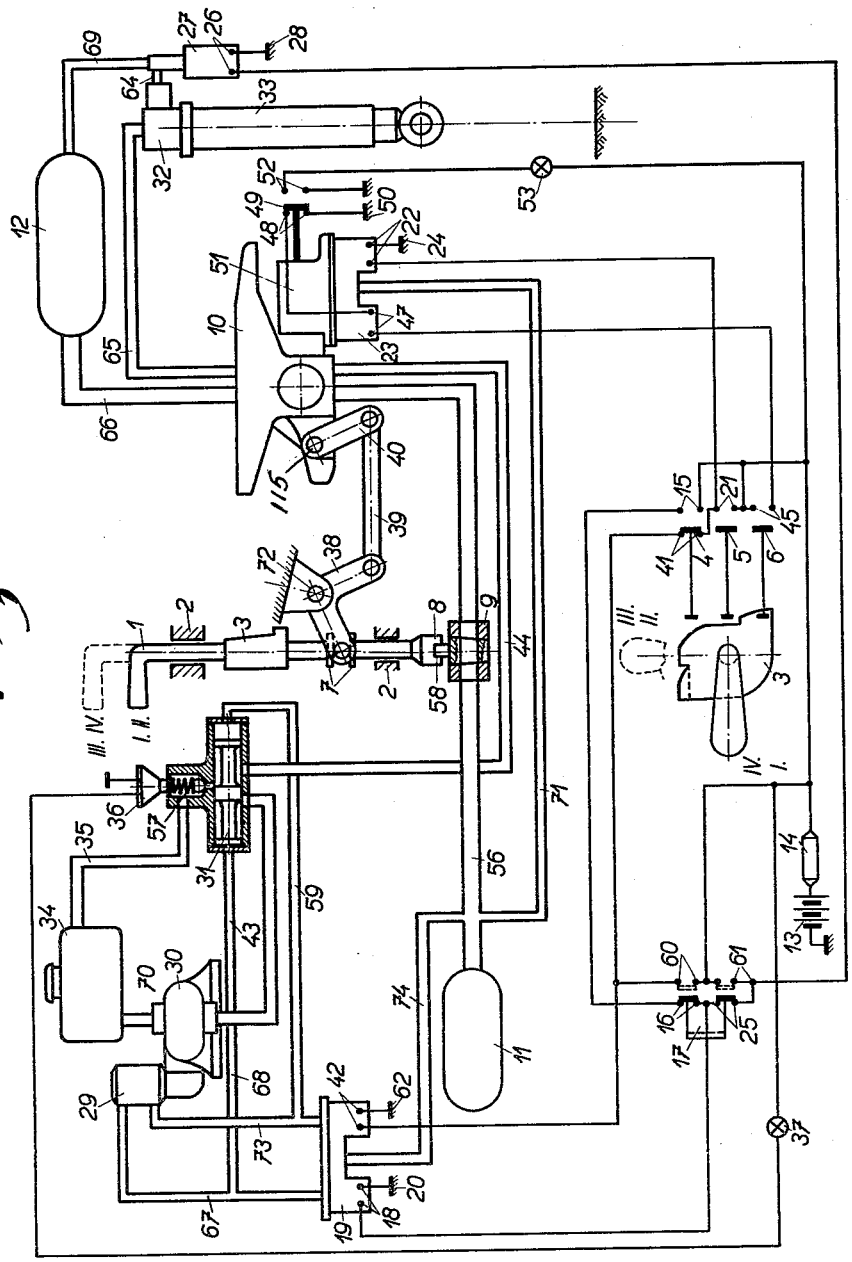

Josef Zajac, Stramberk, Pavel Schön, Mistek, and Stanislav Černoch, Zenklava, Czechoslovakia, assignors to Tatra, narodni podnik, Koprivnice, Czechoslovakia
Filed Sept. 10, 1958, Ser. No. 760,241
Claims priority, application Czechoslovakia Oct. 9, 1957
16 Claims. (Cl. 280—427)

This invention relates to a coupling system for articulated vehicles.

Known articulated vehicles are equipped with semiautomatic controls operating which make the connection of the coupling to the trailer automatic, but the coupling is locked, the jack supporting the trailer is retracted, and the tractor and trailer are disconnected by hand. When carrying out such operations, the driver has to get out of the tractor. Considerable effort is involved particularly in lowering the trailer jack. Another disadvantage of the conventional arrangement is the location of the pump of the hydraulic trailer jack. Connection of the electrical and pneumatic cricuits between the motive unit and the trailer is usually by cables and flexible tubes and the connection has to be established by hand.

The disadvantages set forth are obviated by the present invention according to which both the connecting and disconnecting of the tractor and trailer can be effected directly from the control position without the driver having leave of the motive unit.

The specification of our copending application Ser. No. 726,009, filed on April 2, 1958, now U.S. Patent No. 2,924,464, discloses a coupling for articulated vehicles in which the electrical, pneumatic and hydraulic circuits of the vehicle are automatically completed when the trailer and tractor are coupled together and disconnected when the trailer is uncoupled from the tractor.

The object of this invention is to provide a system by which the coupling and jack can be operated from the driver's cabin of the tractor to couple together or uncouple the trailer and the tractor.

The present invention in its more specific aspects provides in an articulated vehicle, the combination of an articulating coupling between the tractor and trailer of the vehicle power means for engaging or disengaging the coupling a locking device for locking the coupling engaged a power operated jack for supporting the trailer when disconnected, a source of power and control means operable in steps firstly to connect the power jack to the source of power for operation to extend the jack and support the trailer, secondly to unlock the coupling and finally to connect the said power means to the source of power for operation to disengage the coupling.

An embodiment of the invention will now be described by way of example only, with reference to the accompanying drawing.

The invention will be described as applied to an articulated vehicle comprising a tractor and a two-wheeled trailer which is supported by a hydraulic jack when uncoupled from the tractor and can be coupled to the trailer by an articulating coupling arranged as described in the specification of our aforementioned co-pending application Serial Number 726,009, filed on April 2, 1958.

In the drawing:

FIG. 1 shows a coupling of the type disclosed in our copending application, the view being in elevational axial section; and FIG. 2 illustrates the control apparatus of this invention as applied to the coupling of FIG. 1.

Referring initially to FIG. 1, there is seen the fifth wheel plate 10 of a tractor not otherwise shown. A pivot pin 101 is vertically slidable in a bearing sleeve 102 of the fifth wheel. As seen in FIG. 1, the pivot pin 101 is in its upper position in which it rotatably engages a hub 104 fixedly mounted in the body 105 of the trailer.

Upward movement of the pin 101 is actuated by a pneumatic motor consisting of a working cylinder 51 in which a piston 108 is slidable. The piston rod 107 transmits the movement of the piston 108 to a pivotally mounted segment 110 which meshes with a rack 109 formed in the pin 101. The bottom of the pin 101 carries a lug 111 having a radial opening 112 which is engaged by a pin 113 whereby the pin is axially locked in the engaged position. The pin 113 is radially movable into and out of engagement with the openings 112 by an arm 114 fixedly mounted on a pivot pin 115.

The control apparatus diagrammatically illustrated in FIG. 2 comprises a control lever 1 supported in two bearings 2 and the engaging movements of the lever (which is shown both in plan and in elevation in the drawing) are limited by a cut-out provided in a guide (not shown) so as to enable it to turn from an initial position I through 90° clockwise, as seen in FIG. 2, into position II, then upward into position III, and finally to 90° counterclockwise into position IV. The shaft of the lever 1 is provided in its middle portion with a cam 3 engaging electrical switches 4, 5, 6, and with two rings 7 for coupling lock control; the lower end of the lever shaft is fitted with a fork 8 for closing or opening an air shut-off valve 9. With the lever 1 in the initial position I, and with the trailer engaged, the connecting mechanism of the coupling which is schematically represented by the fifth wheel 10 is locked, the air shut-off valve 9 is opened, and compressed air passes from the reservoir 11 through pipeline 56, through the centre of the coupling 10, and a pipe-line 66 to a reservoir 12 which is a part of the air brake system of the trailer. The cam 3 is not engaging any of the switches 4, 5, 6 and the entire device remains therefore inoperative.

*Disconnecting the trailer and tractor.*—When the lever 1 is shifted from position I into position II, the air conduit from the reservoir 11 to the trailer is closed by the air shut-off valve 9. The cam 3 closes the switches 4, 5 and an electric circuit is established from a battery 13 through a fuse 14, contacts 15 of the switch 4; contacts 16 of a push-button switch 17 and terminals 18 of the electrically operated valve 19 to an earth or ground connection 20. At the same time electric current flows through contacts 21 of the switch 5, terminals 22 of an electrically operated valve 23 to the earth 24 and in parallel through contacts 25 of the push-button switch 17, terminals 26 of electrically operated valve 27 to the earth 28. The electrically operated valve 19 admits compressed air from the conduit 74 through the conduit 67 into a working cylinder 29, which engages a clutch integral with the oil pump 30 to connect the pump to the power unit (not shown) of the tractor so that the pump is driven. At the same time compressed air flows through a pipe line 68 to actuate an overflow valve 31, so that pipe lines 43, 44 are interconnected. The electrically operated valve 27 admits compressed air from the reservoir 12 through pipe lines 69, 64 to a shut-off valve 32 of the jack 33, and opens the valve. The pump 30 acts to pump fluid from the tank 34 through pipe lines 70, 43, to the overflow valve 31, and the pipe line 44 to the coupling 10, through the pipe line 65 to the shut-off valve of the hydraulic jack 33 which is extended to support the front end of the trailer. As soon as the jack 33 has been fully extended, the oil pressure rises so that, within the overflow valve 31, a safety valve 57 is opened and oil returns through a pipe-line 35 to the tank 34. This return-flow of pressure oil closes a pressure switch 36 in circuit with a control lamp 37 which lights up signalling that the jack 33 has been extended. Simultaneously the electrically operated valve 23 admits compressed air from the conduit 71 into the working cylinder 51 of the coupling 10, and maintains the trailer coupling mechanism engaged.

When the lever 1 is shifted from position II into position III, the rings 7 displace a bell crank lever 38, pivotally mounted on a pin. The movement of the lever is transmitted by a pull-rod 39 to an arm 40 which is fixed on the pivot pin 115 of the locking device of the coupling 10 which is thus released. The fork 8 of the lever 1 is lifted away from the square head 58 of the air shut-off valve 9. The cam 3 reverses the switch 4 to open the contacts 15 and close the contacts 41. Thus the current passes through the contacts 41 of the switch 4, and the terminals 42 of the electrically operated valve 19. Compressed air passes from the conduit 74 through the conduit 73 to the working cylinder 29, and the pump 30 is disconnected from the tractor power unit. At the same time, compressed air passes through a conduit 59 into the overflow valve 31 to operate it so that it closes the conduit 43 and interconnects the conduit 35 with the lines 44 and 65, leading to the hydraulic jack 33. The electrically operated valve 27 is deenergised and cuts off compressed air flow to the shut-off valve 32. The flow of fluid is interrupted and the pressure switch 36 opens so that the control light 37 goes out.

When the lever 1 is then shifted into position IV, the cam 3 opens the contacts 21 of the switch 5 and closes the contacts 45 of the switch 6 to complete a circuit through terminals 47 of the electric valve 23, contacts 48 of a limit switch 49 to the earth 50. The valve 23 allows compressed air to flow into the working cylinder 51 of the coupling 10, so that the tractor and trailer are uncoupled. At the end of the piston stroke of the working cylinder 51, the switch 49 is reversed, the contacts 48 are opened and contacts 52 are closed. Thus an electric circuit is established through a control lamp 53, located on the dashboard and indicating disconnecting of the trailer so that the tractor may drive off.

*Connecting the tractor and trailer.*—The lever 1 is shifted from position IV through positions III and II into position I, whereby the entire operation is repeated in reverse order. In position III the cam 3 closes the contacts 21 of the switch 5 and current flows through the terminals 22 of the electrically operated valve 23 to the earth 24. Compressed air flows from the conduit 71 into the working cylinder 51, which connects the tractor and trailer by means of the coupling 10. The contacts 52 of the terminal switch 49 are opened and extinction of the control lamp 53 indicates that the connection has been made. At the same time the contacts 48 of the switch 49 are closed, however, they are not under current, because the contacts 45 of the switch 6 are open.

With the lever 1 in position II, the coupling 10 is mechanically locked by the lever 38, the pull-rod 39 and the lever 40. The fork 8 engages the square head 58 of the air shut-off valve 9. Simultaneously, the cam 3 closes the contacts 15 of the switch 4. Current flows through contacts 16 and 25 of push button switch 17, terminals 18 of the electrically operated valve 19 to the earth 20 and in parallel through the terminals 26 of the electrically operated valve 27 to the earth 28. Thus compressed air passes from the conduit 74 through the valve 19 into the conduit 67 and the working cylinder 29 of the pump 30, which is actuated and the shut-off valve 32 is also opened. As the hydraulic jack is fully extended, the overflow valve 31 returns oil from the conduit 43 into the tank 34 through pipe line 35.

The lever 1 is returned to position I. The cam 3 opens the contacts 15 and 21 of the switches 4 and 5 and closes the contacts 41. When the push-button 17 is then pressed, the contacts 60 and 61 are closed.

Electric current flows from the storage battery 13 through the fuse 14, the contacts 60, 61 of the push-button switch 17, the terminals 42 of the electrically operated valve 19 to the earth 62 and also through the terminals 26 of the electrically operated valve 27 to the earth 28 and through the contacts 41 of the switch 4, the terminals 22 of the electrically operated valve 23 to the earth 24. The valve 19 passes compressed air from the pipe line 74 into the pipe line 73 of the working cylinder 29 and thus the pump 30 is put out of operation. At the same time compressed air is conveyed through the conduit 59 to the overflow valve 31, whereby the pipe line 35 is interconnected with the pipe line 44. The valve 27 admits compressed air through the conduits 69, 64 to the shut-off valve 32 to open it. By action of a spring (not shown) the jack 33 is then retracted and discharges oil through the conduit 65, the coupling 10, the conduit 44 and through the overflow valve 31, the conduit 35 to the tank 34.

We claim:
1. In an articulated vehicle having an articulating coupling between the tractor and trailer of the vehicle, in combination, pressure fluid operated means for selectively engaging and disengaging said coupling; a locking device for selectively locking said coupling in the engaged position; a pressure-fluid operated jack for supporting the trailer when disconnected; a source of pressure fluid; and control means operative to successively connect said jack to said source of pressure fluid so as to extend the jack and support the trailer thereon, thereafter to unlock said coupling, and finally to connect said engaging means to said source of pressure fluid to disengage the coupling.

2. In an articulated vehicle as set forth in claim 1, said source of pressure fluid including a pipe line leading from the jack to the tractor; a valve on the trailer for closing said pipe line; a reservoir for liquid on the tractor; a pump on the tractor for supplying liquid from said reservoir to said pipe line; a source of power in the tractor; and said control means including manually operable means in the tractor for connecting said pump to said source of power to drive the pump so that it supplies liquid to the jack to extend it; and means in the tractor operable to close said valve after said jack is extended to maintain it extended.

3. In an articulated vehicle, as set forth in claim 2, a pressure responsive device communicating with said pipe line in the tractor; and an indicator actuated by said pressure responsive device when the pressure in said pipe line exceeds a predetermined pressure.

4. In an articulated vehicle as set forth in claim 2, a return conduit from said pipe line to said reservoir; and pressure-responsive relief valve means in said return conduit, said valve means being biased toward the closed position and responsive to the pressure in said pipe line when it exceeds a predetermined pressure to open said return conduit.

5. In an articulated vehicle as set forth in claim 2, a return conduit from said pipe line to said reservoir; relief valve means in said return conduit, said valve means being biased toward the closed position and responsive to the pressure in said pipe line when it exceeds a predetermined pressure to open said return conduit; and indicator means actuated by said relief valve means when in the open position.

6. In an articulated vehicle, as set forth in claim 2, a return conduit from said pipe line to said reservoir; relief valve means in said return conduit, said valve means being biased toward the closed position and responsive to the pressure in said pipe line when it exceeds a predetermined pressure to open said return conduit; an overflow valve in said pipe line intermediate said jack and said pump and movable between two positions, in one position to disconnect said pump from said jack and connect the latter to said return conduit and in a second position to connect said pipe line to said return conduit; and means for moving said overflow valve from said first to said second position thereof when said pump is actuated and for returning the same to its first position when said pump is stopped.

7. In an articulated vehicle having a tractor and a trailer, in combination, a hydraulic jack for supporting the trailer when disconnected; a pipe line leading from said jack to the tractor; a pneumatically operated valve on the trailer for closing said pipe line; a source of power; a reservoir for liquid on the tractor; a pump on the tractor for supplying liquid under pressure from said reservoir to said pipe line; air operated connecting means for connecting said pump to said source of power; a source of compressed air on the tractor; an air operated overflow vave in said pipe line intermediate the ends thereof so as to divide said pipe line into two parts; a return conduit from said overflow valve to said reservoir, said overflow valve being adjustable between a first position in which it closes the part of the pipe line leading from said overflow valve toward said pump and connects the other part of said pipe line to said return conduit, and a second position in which it connects the two parts of said pipe line; a relief valve in said return conduit arranged to open when the pressure in said pipe line exceeds a predetermined pressure; a first control valve for connecting said air operated connecting means and said overflow valve to said source of compressed air in the tractor; a second control valve for connecting said pneumatically operated valve to said source of compressed air in the tractor; and manually operable means for sequentially actuating said first control valve and said second control valve.

8. In an articulated vehicle having a tractor and a trailer, in combination, an articulating coupling between the tractor and the trailer; engaging means for selectively engaging said coupling; a locking device for locking the coupling when engaged; a jack for supporting the trailer when disconnected; a source of power; a control member movable in one direction between a first and a second position, in a second direction between the second and a third position and in the first direction between the third and a fourth position; first connecting means actuated by said control member on movement from the first to the second position thereof to connect said jack to said source of power for actuation thereby to extend; linking means operatively connected to said control member and to said locking device for actuation of the latter to unlock said coupling when said control member moves from the second to the third position thereof; and second connecting means actuated by said control member when the latter moves from said third to said fourth position thereof to connect said engaging means to said source of power for disengaging said coupling.

9. In an articulated vehicle as set forth in claim 8 wherein the linking means connected to said control member and to said locking device is a mechanical linkage.

10. In an articulated vehicle as set forth in claim 8, wherein said jack is a hydraulic jack; said source of power includes a source of liquid under pressure, and said first connecting means includes a pipe line between the jack and the source of liquid under pressure and a valve in said pipe line.

11. In an articulated vehicle as set forth in claim 10, said valve in said pipe line being on said tractor and operatively connected to said control member in such a manner as to be closed on movement of said control member from the second to the third position thereof.

12. In an arrangement for controlling the connection between separate units of an articulated vehicle equipped with a coupling for connecting said units, the coupling being adapted to be actuated for selectively securing said units to each other, in combination, a source of electric current; a source of compressed air; a source of pressure fluid; a manual control member movable between a plurality of positions; cam means operatively connected to said control member; switch means in circuit with said source of electric current and actuated by said cam means when said member moves between said positions thereof; electrically actuated air valve means communicating with said source of compressed air and connected to said switch means for actuation thereby; air actuated pressure fluid valve means communicating with said source of pressure fluid and connected to said air valve means for air valve controlled actuation by said compressed air; a pressure fluid operated retractable support on one of said portions communicating with said pressure fluid valve means for valve-controlled actuation by said pressure fluid; and pressure fluid operated coupling actuating means connected to said pressure fluid valve means for valve controlled actuation by said fluid.

13. In an arrangement for controlling the connection between separate units of an articulated vehicle equipped with a coupling for connecting said units, the coupling being adapted to be actuated for selectively securing said units to each other, in combination, a source of electric current; a source of compressed air; a source of pressure fluid, a manual control member movable between a plurality of positions; cam means operatively connected to said control member; switch means in circuit with said source of electric current and actuated by said cam means when said member moves between said positions thereof; a shut-off valve communicating with said source of compressed air and operatively connected to said control member for actuation thereby when said control member moves from one to another of said positions thereof; electrically actuated air valve means communicating with said shut-off valve and connected to said switch means for actuation thereby; air actuated pressure fluid valve means communicating with said source of pressure fluid and connected to said air valve means for air valve controlled actuation by said compressed air; a pressure fluid operated retractable support on one of said portions communicatnig with said pressure fluid valve means for valve-controlled actuation by said pressure fluid; and pressure fluid operated coupling actuating means connected to said pressure fluid valve means for valve controlled actuation by said fluid.

14. In an arrangement for controlling the connection between separate units of an articulated vehicle equipped with a coupling for connecting said units, the coupling being adapted to be actuated for selectively securing said units to each other and having mechanical locking means for selectively locking said operating means in the secured position, in combination, a source of electric current; a source of compressed air, a source of pressure fluid; a manual control member movable between a plurality of positions; cam means operatively connected to said control member; switch means in circuit with said source of electric current and actuated by said cam means when said member moves between said positions thereof; electrically actuated air valve means communicating with said source of compressed air and connected to said switch means for actuation thereby; air actuated pressure fluid valve means communicating with said source of pressure fluid and connected to said air valve means for air valve controlled actuation by said compressed air; a pressure fluid operated retractable support on one of said portions communicating with said pressure fluid valve means for valve-controlled actuation by said pressure fluid; pressure fluid operated coupling actuating means connected to said pressure fluid valve means for valve controlled actuation by said fluid; and connecting means for connecting said locking means to said control member for actuation thereby.

15. In an arrangement for controlling the connection between separate units of an articulated vehicle equipped with a coupling for connecting said units, the coupling being adapted to be actuated for selectively securing said units to each other, in combination, a source of electric current; a source of compressed air; a source of pressure fluid; a manual control member movable between a plurality of positions; cam means operatively connected to said control member; switch means in circuit with said source of electric current and actuated by said cam means when said member moves between said positions thereof; electrically actuated air valve means communicating with said source of compressed air and connected to said switch means for actuation thereby; air actuated pressure fluid valve means communicating with said source of pressure fluid and connected to said air valve means for air valve controlled actuation by said compressed air; a pressure fluid operated retractable support on one of said portions communicating with said pressure fluid valve means for valve-controlled actuation by said pressure fluid; pressure fluid operated coupling actuating means connected to said pressure fluid valve means for valve controlled actuation by said fluid; and a manual switch in circuit with said source of current and said air valve means for selectively retracting said support when said switch is manually actuated.

16. In an arrangement for controlling the connection between separate units of an articulated vehicle equipped with a coupling for connecting said units, the coupling being adapted to be actuated for selectively securing said units to each other and having mechanical locking means for selectively locking said operating means in the secured position, in combination, a source of electric current; a source of compressed air; a source of pressure fluid; a manual control member movable between a plurality of positions; cam means operatively connected to said control member; switch means in circiut with said source of electric current and actuated by said cam means when said member moves between said positions thereof; a shut-off valve communicating with said source of compressed air and operatively connected to said control member for actuation thereby when said control member moves from one to another of said positions thereof; electrically actuated air valve means communicating with said shut-off valve and connected to said switch means for actuation thereby; air actuated pressure fluid valve means communicating with said source of pressure fluid and connected to said air valve means for air valve controlled actuation by said compressed air; a pressure fluid operated retractable support on one of said portions communicating with said pressure fluid valve means for valve-controlled actuation by said pressure fluid; pressure fluid operated coupling actuating means connected to said pressure fluid valve means for valve controlled actuation by said fluid; connecting means for connecting said locking means to said control member for actuation thereby; and a manual switch in circuit with said source of current and said air valve means for selectively retracting said support when said switch is manually actuated.

References Cited in the file of this patent

UNITED STATES PATENTS

| | | |
|---|---|---|
| 1,621,592 | Land | Mar. 22, 1927 |
| 1,684,836 | Land | Sept. 18, 1928 |
| 2,016,468 | Wagner | Oct. 8, 1935 |
| 2,363,851 | Barnhart et al. | Nov. 28, 1944 |
| 2,478,653 | Callan | Aug. 9, 1949 |
| 2,664,299 | Fitch | Dec. 29, 1953 |
| 2,837,312 | Troche | June 3, 1958 |